US011410368B2

(12) United States Patent
Stevenson et al.

(10) Patent No.: US 11,410,368 B2
(45) Date of Patent: Aug. 9, 2022

(54) ANIMATION CONTROL RIG GENERATION

(71) Applicant: Weta Digital Limited, Wllington (NZ)

(72) Inventors: Thomas Stevenson, Wellington (NZ); Edward Sun, Wellington (NZ)

(73) Assignee: UNITY TECHNOLOGIES SF, San Francisco, CA (US)

(*) Notice: Subject to any disclaimer, the term of this patent is extended or adjusted under 35 U.S.C. 154(b) by 0 days.

(21) Appl. No.: 17/206,634

(22) Filed: Mar. 19, 2021

(65) Prior Publication Data
US 2022/0028145 A1    Jan. 27, 2022

Related U.S. Application Data

(60) Provisional application No. 63/056,438, filed on Jul. 24, 2020, provisional application No. 63/056,443, filed on Jul. 24, 2020.

(51) Int. Cl.
G06T 13/40    (2011.01)
G06T 17/00    (2006.01)
(Continued)

(52) U.S. Cl.
CPC ............... G06T 13/40 (2013.01); G06F 8/20 (2013.01); G06F 8/36 (2013.01); G06F 8/48 (2013.01);
(Continued)

(58) Field of Classification Search
None
See application file for complete search history.

(56) References Cited

U.S. PATENT DOCUMENTS 9,489,759 B1 * 11/2016 Gregory ................. G06T 13/40
2009/0091563 A1    4/2009 Viz
(Continued)

FOREIGN PATENT DOCUMENTS

EP    3358527 A    8/2018

OTHER PUBLICATIONS

Unity Manual; "Animation: Working with humanoid animation"; Jan. 18, 2016; pp. 1-13; https://docs.unity3d.com/460/Documentation/Manual/AvatarCreationandSetup.html (Year: 2016).*
(Continued)

Primary Examiner — Peter Hoang
(74) Attorney, Agent, or Firm — Trellis IP Law Group, PC; Lisa Benado

(57) ABSTRACT

An animation system is provided for generating an animation control rig for character development, configured to manipulate a skeleton of an animated character. Hierarchical representation of puppets includes groups of functions related in a hierarchy according to character specialization for creating the animated rig are derived using base functions of a core component node. The hierarchical nodes may include an archetype node, at least one appendage node, and at least one feature node. In some implementations, portions of a hierarchical node, including the functions from the core component node, may be shared to generate different animation rigs for a variety of characters. In some implementations, portions of a hierarchical node, including the component node functions, may be reused to build similar appendages of a same animation rig.

20 Claims, 11 Drawing Sheets

(51) Int. Cl.
*G06F 8/20* (2018.01)
*G06F 8/36* (2018.01)
*G06F 8/41* (2018.01)
*G06F 8/658* (2018.01)
*G06F 8/72* (2018.01)
*G06T 19/20* (2011.01)

(52) U.S. Cl.
CPC ............... *G06F 8/658* (2018.02); *G06F 8/72* (2013.01); *G06T 17/005* (2013.01); *G06T 19/20* (2013.01); *G06T 2213/08* (2013.01); *G06T 2219/2021* (2013.01)

(56) References Cited

U.S. PATENT DOCUMENTS

| | | |
|---|---|---|
| 2011/0102424 A1 | 5/2011 | Hibbert |
| 2012/0210262 A1 | 8/2012 | Sheeler |
| 2015/0022517 A1 | 1/2015 | Jutan |
| 2016/0103828 A1* | 4/2016 | Woolf ................... G06F 16/164 707/705 |
| 2019/0325633 A1 | 10/2019 | Miller |
| 2020/0320764 A1 | 10/2020 | Bryson |

OTHER PUBLICATIONS

Bhali, Zeeshan, et al. "Template based procedural rigging of quadrupeds with custom manipulators." 2013 International Conference on Advanced Computer Scienve Applications and Technologies. IEEE, 2013.[Year: 2013].
https://www.indefiant.com—Indefiant Recode—5 pages.
https://www.liveplusplus.tech—Live++—7 pages.

* cited by examiner

ANIMATION CONTROL RIG GENERATION

CROSS REFERENCES TO RELATED APPLICATIONS

This application claims the benefit of U.S. Provisional Patent Application Ser. No. 63/056,443, entitled METHODS AND SYSTEMS FOR GENERATING AN ANIMATION CONTROL RIG, filed on Jul. 24, 2020 and U.S. Provisional Patent Application Ser. No. 63/056,438, entitled METHODS AND SYSTEMS FOR GENERATING AN ANIMATION CONTROL RIG, filed on Jul. 24, 2020 which are hereby incorporated by reference as if set forth in full in this application for all purposes.

This application is related to the following application, U.S. patent application Ser. No. 17/206,653, entitled MANIPULATING CODE FOR ANIMATION CONTROL RIG GENERATION, filed on Mar. 19, 2021, which is hereby incorporated by reference as if set forth in full in this application for all purposes.

FIELD OF THE INVENTION

The present disclosure generally relates to methods and systems for generating an animation control rig configured to manipulate a skeleton of an animated character.

BACKGROUND

Visual content generation systems are used to generate imagery in the form of still images and/or video sequences of images, for instance, used in visual productions (e.g., movies, videos, clips, and recorded visual media). Such still images and/or video sequences of images can include live action scenes obtained from a live action capture system, computer generated scenes obtained from an animation creation system, or a combination thereof.

An animation artist uses tools to specify content for the imagery. Where the imagery includes computer generated scenes, the animation artist may use various tools to specify the positions in a scene space such as a three-dimensional coordinate system of objects (also referred to as "characters"). Some characters are articulated, having multiple parts, e.g., limbs, with joints that are movable with respect to each other.

The animation artist may retrieve a representation of an articulated object, such as a digital skeleton of a three dimensional (3-D) model, and generate an animated sequence of movements of the articulated object, or part thereof. Animation sequence data representing an animation sequence may be stored in data storage, such as animation sequence storage.

Animation sequence data might be in the form of time series of data for points of an articulated object having attributes that are controllable by creation of a digital control rig representing a sculpture of an object. Various aspects of animation sequence movement may be authored in source code that is then compiled for runtime operation efficiency. The generation of animation sequence data to create an articulated object has the potential to be a complicated task.

SUMMARY

The present animation system enables generation of animation rigs for character creation by grouping functions according to character specialization into hierarchical nodes. Base core functions of a core component node are used to derive the hierarchical nodes. In some implementations, portions of a hierarchical node, including the functions from the core component node, may be shared to generate different animation rigs for a variety of characters. In some implementations, portions of hierarchical nodes, including the core component node functions, may be reused in the same animation rig to build similar appendages for a particular animated character. The hierarchical nodes may include in descending order, an archetype node, at least one appendage node, and at least one feature node.

In some implementations, a method is provided to generate an animation control rig configured to manipulate a skeleton of an animated character. The method includes providing a first hierarchy of function groups which includes an archetype first node, at least one appendage second node descending from the archetype first node, and at least one third node descending from the appendage second node. At least one core component node is provided that includes a set of base core functions used to derive the archetype first node, the at least one appendage second node, and the at least one third node of the first hierarchy. A second hierarchy of function groups is generated by applying the at least one core component node to derive one or more nodes of the second hierarchy.

The core component node further may include at least one of one or more interfaces or one or more connections. Also, the third node may be a feature node specifying a relationship between two of more of the at least one appendage second node.

In more specific implementations, the second hierarchy may relate to the first hierarchy through a similarity of one or more nodes of the second hierarchy to at least one of: the archetype first node, the at least one appendage second node, or the at least one third node of the first hierarchy.

The method may include enabling inheritance of functions by at least one of the archetype first node, the at least one appendage second node, and the at least one third node from a respective lower level node in the first hierarchy. Inheritance of functions from a respective upper level node of the first hierarchy may be disabled. The archetype first node, the at least one appendage second node, and the at least one third node may inherit core components of a respective lower level node in the first hierarchy and adding respective functions specific to the given node to derive the given node from the core component.

The method may also include detecting a change in at least one given node of the archetype first node, the at least one appendage second node, or the at least one third node of the first hierarchy. In response to detecting the change, source code associated with the change may be compiled.

In some implementations, a computer system for generating an animation control rig configured to manipulate a skeleton of an animated character may be provided. The system may include one or more processors and a storage medium storing instructions. The instructions, when executed by the one or more processors may be operable to perform certain processes. The processes may include providing a first hierarchy of function groups which include an archetype first node, at least one appendage second node descending from the archetype first node, and at least one third node descending from the appendage second node. Also provided may be at least one core component node. The core component node may include a set of base core functions used to derive the archetype first node, the at least one appendage second node, and the at least one third node of the first hierarchy. The processes may further include generating a second hierarchy of function groups by applying the at least one core component node to derive one or more nodes of the second hierarchy. The second hierarchy may relate to the first hierarchy through a similarity of one or more nodes of the second hierarchy to at least one of: the archetype first node, the at least one appendage second node, or the at least one third node of the first hierarchy.

The at least one core component node may also include at least one of one or more interfaces or one or more connections. In addition, the at least one third node may be a feature node specifying a relationship between two of more of the at least one appendage second node.

The operation of providing the archetype first node, the at least one appendage second node, and the at least one third node may include each given node inheriting core components of a respective lower level node in the first hierarchy and adding respective functions specific to the given node to derive the given node from the core component. Accordingly, the processes may include enabling of inheritance of functions by at least one of the archetype first node, the at least one appendage second node, and the at least one third node from a respective lower level node in the first hierarchy. Inheritance of functions from a respective upper level node of the first hierarchy may also be disabled.

In some implementation, non-transient storage medium may be provided that stores instructions to generate an animation control rig configured to manipulate a skeleton of an animated character. When the instructions are executed by at least one processor, they may be operable to perform certain processes. Such processes may include providing a first hierarchy of function groups which includes an archetype first node, at least one appendage second node descending from the archetype first node, and at least one third node descending from the appendage second node. Also, at least one core component node may be provided, which includes a set of base core functions used to derive the archetype first node, the at least one appendage second node, and the at least one third node of the first hierarchy. The processes may additionally include generation of a second hierarchy of function groups by applying the at least one core component node to derive one or more nodes of the second hierarchy.

The at least one core component node may further include at least one of one or more interfaces or one or more connections. In the first hierarchy, the at least one third node may be a feature node specifying a relationship between two of more of the at least one appendage second node.

The second hierarchy may relate to the first hierarchy through a similarity of one or more nodes of the second hierarchy to at least one of: the archetype first node, the at least one appendage second node, or the at least one third node of the first hierarchy. The operation of providing the archetype first node, the at least one appendage second node, and the at least one third node may include each of these given nodes inheriting core components of a respective lower level node in the first hierarchy and adding respective functions specific to the given node to derive the given node from the core component. The processes may include enabling inheritance of functions by at least one of the archetype first node, the at least one appendage second node, and the at least one third node from a respective lower level node in the first hierarchy. Inheritance of functions from a respective upper level node of the first hierarchy may be disabled.

A further understanding of the nature and the advantages of particular embodiments disclosed herein may be realized by reference to the remaining portions of the specification and the attached drawings.

BRIEF DESCRIPTION OF THE DRAWINGS

Various embodiments in accordance with the present disclosure will be described with reference to the drawings.

DETAILED DESCRIPTION

Figure 1:
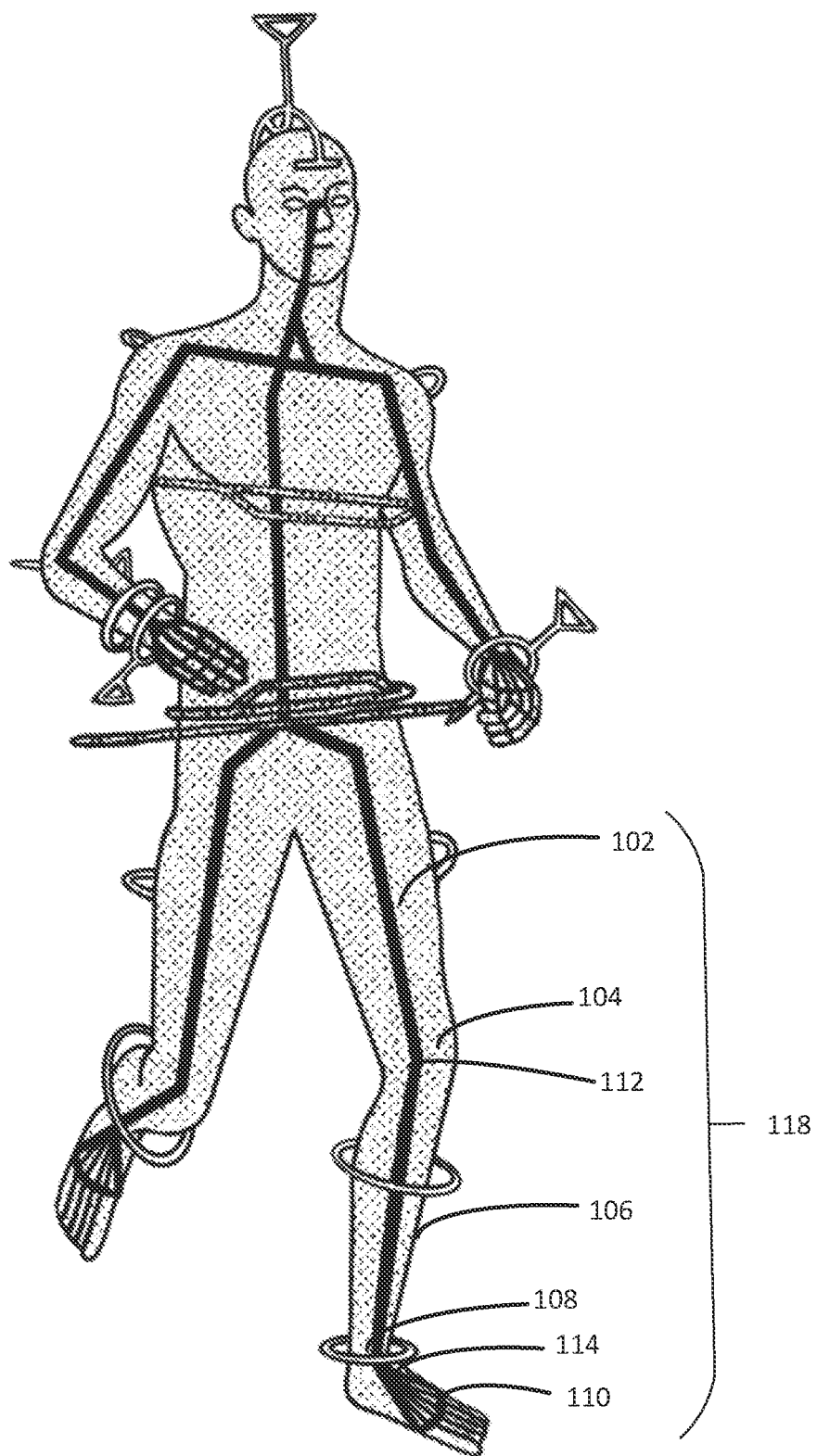
FIG. 1 illustrates an example of a control rig configured to enable an artist to create animation sequence data, in accordance with some implementations.

In the following description, various embodiments will be described. For purposes of explanation, specific implementations and details are set forth in order to provide a thorough understanding of the embodiments. However, it will also be apparent to one skilled in the art that the embodiments may be practiced without the specific details. Furthermore, well-known aspects may be omitted or simplified so as not to obscure the embodiment being described.

The present animation system employs a hierarchical representation of puppets in which categorical grouping of software functions, (referred to as "nodes") are employed to create an animation rig configured to effectuate movement of parts of a moveable character, e.g., an animated character. The animation system presented herein may be applicable with various 3-D (three-dimensional) animation, modeling, simulation and rendering software.

Rather than creating hierarchies for control rigs that simply connect parts, e.g., interconnection of bones, of a character, the present animation system provides for grouping of functions according to characteristics of a character, such as configurations to provide overall individualities of a character, archetypes that embody the character, appendages that make up the character, and features that specify relationships of parts of the character. The logical grouping of functions, e.g., arguments, into the hierarchical nodes based on character specialization enables simplified generation of animation rigs by users who may not necessarily be skilled in software programming.

In some implementations, a node of a hierarchical group may include one or more sub-nodes that refer to greater specificity of parts represented by a node. For example, included within an appendage node such as a hand, may sub-nodes such as fingers or claw sub-nodes. The sub-nodes may also be organized into a sub-hierarchy under a node of the hierarchy. The term, "node" or "sub-node" may also generally be referred to as a "component" of a hierarchical tree.

Categories of hierarchical nodes may include an archetype node that ascends from appendage node(s), which may further ascend from feature node(s). An appendage node specifies control points (also referred to as "handles") located at various positions on the appendage and used in creating movement of the appendage. Whereas an archetype node and appendage node include functions related to anatomy, a feature node includes functions that enable creation of mathematics for an associated appendage node. In some implementations, a configuration node sits on top of the archetype and includes functions to provide anatomical settings or limits to the characters under an archetype and maps them to the characters of the archetype. A core component node includes sets of functions that are used to derive the hierarchical nodes. Each hierarchical node includes the base core component node functions, additional functions specific for that node. Each node may further inherit functions from lower level nodes through node-specific functions added to the core component node by lower level nodes.

The present hierarchy permits branching of nodes, such as multiple appendage nodes from an archetype node. Appendage nodes may also include various mathematics that are enabled by multiple feature nodes. The present animation system may enable multiple appendages to be easily produced. For example, a quadruped archetype character rig may be generated by reusing an appendage node for the four leg appendages.

In some implementations, portions of certain hierarchical nodes, including the core component functions, may be reused in building hierarchical nodes of other animation rigs. In some implementations, portions of certain hierarchical nodes may be shared among multiple similar nodes of the same category in an animation rig.

A user of the present animation system might be a person who contributes to the making of the visual production. For example, the user may include an individual responsible for animation of the visual production, such as an artist, a graphics manager, a software programmer, etc. The grouping of functions by character specialization into structural and descriptive components enables presentation on a simple user interface for user, such as an artist, to build an animation rig, without the user needing in depth knowledge of software coding.

Animation rigs are generated for particular moveable characters. For the purposes of the present discussion, a moveable character (also referred to as an animated character or object) may be any representation of a physical object that includes one or more parts that transform in appearance, e.g., some parts appear to move relative to other parts of the object. In some implementations, the moveable character may be an articulated character having joints that serve as points connecting rigid parts, e.g., bones, of the character. The joints and/or parts are manipulated, for example, by operating handles on a rig, to resemble movement via an animated rig.

Moveable characters can include various archetypes, such as persons, or other bipeds, quadrupeds, (such as quadruped animals), moveable items, e.g., props (such as doors, toys, etc.), animals, robots, etc. An archetype is a collection of characters that have a same or similar morphology, e.g., size, shape and/or structure, rather than referencing a specific character.

Animation rigging uses numerous functions, which include blocks of organized, potentially reusable code that dictate movement of various parts of a character. Some other animation systems use a non-hierarchical flat monograph of functions to effectuate movement of a part of a 3-D model. For example, with such other systems, to create movement of an arm, such systems may take the functions for each joint together as a single block of code. With these monographic-type systems, once code is written to build a 3-D model, any subsequent changes may require rewriting and recompiling of the code. The present animation control rigging system provides for more flexibility in reuse of code than these other monographic-type systems.

With the present hierarchical grouping of functions (also referred to as "evaluation units" or "blocks of code") an animation rig may be built in which evaluation units may contain other evaluation units, which in turn contain other evaluation units, each having arguments. Arguments of various evaluation units may be connected to arguments of other evaluation units to form the hierarchical graph.

The present animation system provides a valuable tool for efficient production of animation rigs. The hierarchical nodes of related functions enable the share and reuse of code in similar applications, such as across similar archetypes or similar appendages of a same archetype. The sharing of functions across multiple characters allows for less files and data needed to be created for various characters. In addition, the use of the hierarchical nodes enables multiple representations of the same data, even when similar characters have some differences. Benefits include decrease time in building, compiling, and loading of data.

With use of the present animation system an appendage, for example, may be built once within an appendage node of the hierarchy and then may be built differently multiple times by sharing code between similar appendages. In some implementations, the similar appendages may include parts connected by joints that move in a similar manner, such as a leg and an arm or a neck and a spine. In some implementations, data from similar appendages may be applied to different archetypes. For example, a hip joint of a horse may be moved in a similar manner as a hip joint of a dog. Data representing leg movement of a leg appendage from a hip joint of a horse may be applied to that of a dog.

In another example, an archetype may be reused across multiple similar characters, where a configuration node defining the specific aspects of the characters, e.g., levels of rigidity of the parts of the characters, size of the character, etc., may be varied for the various characters that share an archetype. The reuse of nodes allows for less files and data to be generated and stored. Furthermore, reuse of nodes may reduce time and effort associated with building and compiling by avoiding a need to build archetypes for each character. In this manner, the system provides for flexibility in the use of data once the data is organized in the system, by facilitating passing of the data in different ways to individual hierarchies or within the same hierarchy.

By the animation system providing for grouping of functions, detection of changes to code is simplified. Particular nodes may be compared to find differences with particular nodes, rather than evaluating entire code for the animation rig. Versions of particular nodes may further be saved to compare a given node to previous versions. Where problems with nodes are detected, only the code of the problematic node needs be corrected and compiled. For example, the present animation system enables building of particular nodes, such as an appendage node, independently from other nodes.

Furthermore, when a particular level node is changed in the animation system, lower level nodes in direct relationship with the changed node need not be changed and recompiled. If a feature node has changed, the appendage node in direct relationship to the changed feature node may be rebuilt to keep the nodes in sync. In some implementations, such changes may be automatically propagated to upper level nodes.

Other benefits of the active marker apparatus will be apparent from the further description of the system, as described below.

As shown in FIG. 1, an example of a control rig 100, or animated skeleton is configured to enable an artist to create animation sequence data. Animation sequence data is typically in the form of time series of data for handles (also referred to as "control points") of a character that have attributes and are controllable. In some examples the character includes a humanoid character with limbs and joints that are movable in manners similar to typical human movements.

For illustration purposes in FIG. 1, the control rig 100 represents a humanoid character. The control rig 100 may also be configured to represent a plurality of different characters. In some implementations, the control rig 100 includes a hierarchical set of interconnected bones and connected by joints forming a kinematic chain.

For example, control rig 100 includes various parts, such as a thigh 102, knee 104, lower leg 106, ankle 108, and foot 110, connected by joints 112, 114, to form a leg appendage 118. Control rig 100 may be employed to individually move particular bones and joints using forward kinematics to pose a character. Moving thigh 102 causes a movement of lower leg 106, as lower leg 106 is connected to thigh 102 via knee 104. Thigh 102 and lower leg 106, for example, are in a parent-child relationship. Movement of lower leg 106 is a product of movement of thigh 102, as well as movement of lower leg 106. Control rig 100 may employ inverse kinematics, in which an artist moves ankle 108 for example. If an artist moves ankle 108 upwards, knee 104 may consequently bend and move upwards to accommodate a pose in which ankle 108 is at a user specified location.

Control rig 100 may be formed using a plurality of data points. Control rig 100 may be matched to a skeleton obtained from an animation system, or from, for example, motion capture markers or other means on real-life actors. A live action scene of a human actor may be captured by live action capture system 1002 (see FIG. 10) while wearing mo-cap fiducials, such as high-contrast markers attached to an actor. The movement of those fiducials is determined by live action processing system 1022. Animation driver generator 1044 may convert that movement data into specifications of how joints of an articulated character are to move over time.

Figure 2:
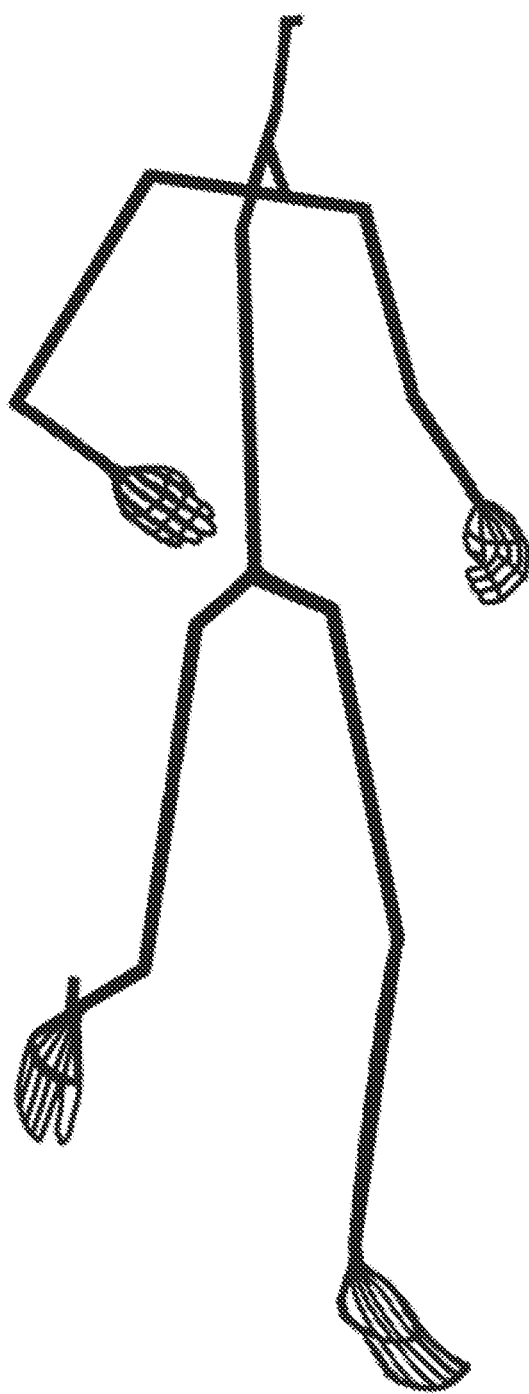
FIG. 2 illustrates an example of a skeleton obtained from an animation system that is matched to the skeleton of the control rig of FIG. 1, in accordance with some implementations.

As shown an example in FIG. 2 an example of a skeleton 200 obtained from an animation system such as visual content generation system 1000. The movement of control rig 100 correspond with the movement of the motion captured skeleton 200 when matched. Control rig 100 may also be controlled freely by an animator to produce movements beyond the movements of a real-life skeleton, such as the real-life skeleton of a human. In some implementations, the control rig 100 may represent a character of a different size than the skeleton of a real-life actor.

Figure 3:
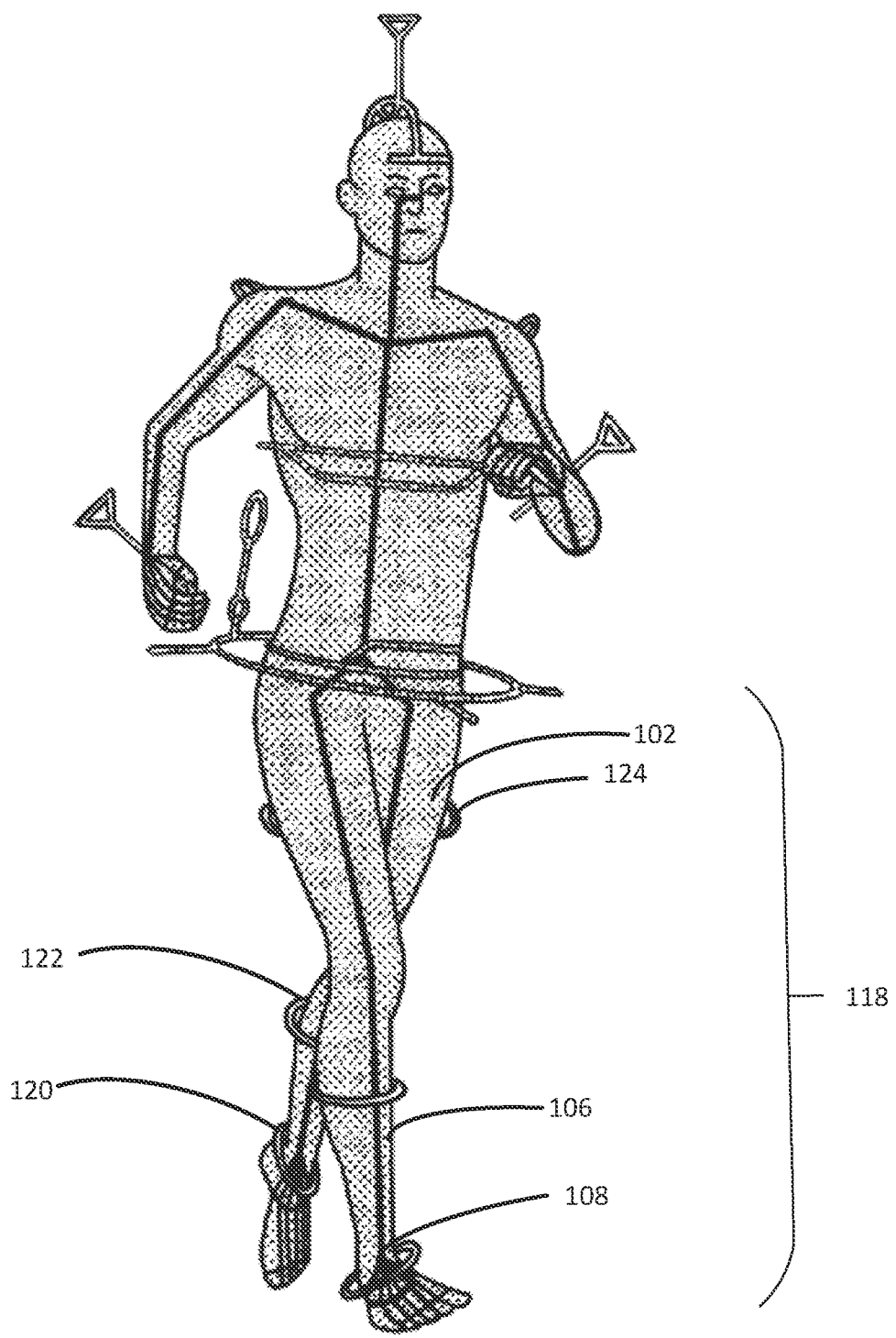
FIG. 3 illustrates an example of a hierarchical node graph suitable for implementing the control rig of FIG. 1, in accordance with some implementations.

As shown in FIG. 3, control rig 100 includes a plurality of handles. Examples of handles are indicated at 120, 122, and 124, respectively. For example, in some implementations, control rig 100 includes handle 120 at the ankle 108 that allows an animator to control the motion of a leg of control rig 100. In another example, handle 122 is positioned at lower leg 106 of rig 100 and/or handle 124 is positioned at thigh 102. Different parts of the control rig 100 have associated to them respective handles.

In some implementations, an artist may create an animation sequence by selecting a handle on control rig 100. Control rig 100 may be displayed, for example, on display 912 (see FIG. 9). The artist selects a handle using input device 914 and/or cursor 916. The handles may be displayed as extending from a character represented by control rig 100. Displaying the handles in this manner enables the artist to select a handle easily.

An artist may, for example, select handle 122 for the lower leg or handle 124 for the upper leg of control rig 100. The artist selects a position and/or location of the handle that is different from the current position and/or location of the handle. This process is known as key-framing. The artist moves controls to new positions at given times, thereby creating key poses in an animation sequence. Interpolation is performed between key poses.

In some implementations, handles may be used to control more than one bone, joint, etc. For example, a handle may be used to control the upper arm and lower arm at the same time.

In some implementations, at least one inverse kinematics operation is performed in order to generate the animation sequence specified by the artist. For example, the artist may wish to specify that ankle 108 is to move from a location within control rig 100 shown in FIG. 1 to a location within control rig shown in FIG. 3. The artist manipulates handle 120 to specify a desired change in ankle location.

A series of calculations is performed to determine what changes in location and/or orientation of parts of control rig 100 are required to result in an orientation of control rig shown in FIG. 3. For example, the new location of handle 120 selected by the artist may require a change in location and/or orientation of at least thigh 102, knee 104, lower leg 106, ankle 108 and foot 110. The changes in location and/or orientation that are required to achieve a goal of the artist are then determined.

Figure 4:
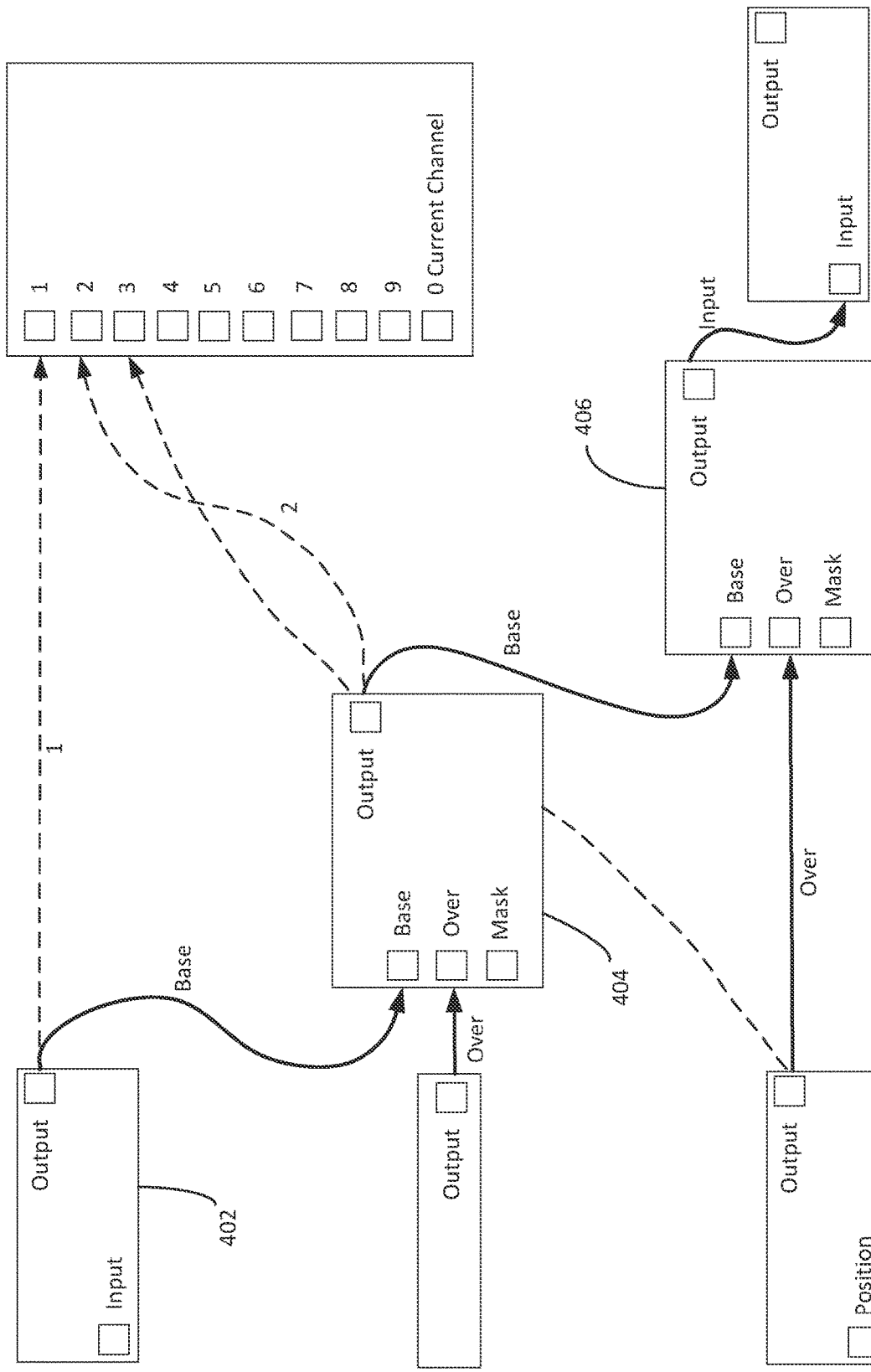
FIG. 4 illustrates an example of a hierarchical node graph suitable for implementing the control rig of FIG. 1, in accordance with some implementations.

FIG. 4 depicts an example of a hierarchical node graph 400 suitable for implementing control rig 100 of FIG. 1. Node graph 400 includes a plurality of nodes, examples of which are shown at 402, 404, and 406, respectively. At least some of the nodes are associated with at least one input and at least one output.

In some implementations, one or more nodes of the hierarchical node graph 400 represent points of movement in the control rig 100, such as respective animation handles of the control rig 100. Outputs from individual nodes include the solved positions of each joint angle and bone position in the kinematic chain. In inverse kinematics, the new joint angles and positions are determined relative to the control input. Inputs to the individual nodes include the new position of a member that is then used to calculate the position of the other members of the skeleton and the associated joint angles. For example, moving the hand from a first position resting on the ground to a new position above the ground will be used to determine the position of the forearm, upper arm, and elbow, and shoulder. In this example, various individual nodes of the graph 400 may represent a hand, forearm, upper arm, and elbow, respectively.

In some implementations, at least one node in hierarchical node graph 400 is inversely solvable through an analytical approach. For example, node 404 is associated with an inverse kinematics function. The artist selects a position and/or location of handle 120 that is different to the current position and/or location of the handle. Node 402 in hierarchical node graph 400 may be, for example, identified as corresponding to handle 120. The inverse kinematics function associated to node 402 is applied according to a movement of handle 120. The output of node 402 becomes an input to node 404. The output of node 404 then becomes the input of node 406.

The result is that the position and angle associated with each node further away from the handle allows the position and/or location of handle 120 to correspond to the position and/or location selected by the artist. In an example, a node that is inversely solvable may involve a problem that has three points of a limb that are analytically solvable using a single solution, such as a trigonometric solution.

In some implementations, at least one node in hierarchical node graph 400 is not inversely solvable through an analytical approach. For those nodes that are not inversely solvable, there is no associated inverse kinematics function. An inverse kinematics function cannot be applied to a handle so that the position and/or location of the handle corresponds to a position and/or location selected by the artist. For example, some positions may involve applying transformations to at least one node in the hierarchical node graph 400 for which there is no associated inverse kinematics function. Such transformations may violate a computational constraint. For example, there may be cases where a node does not have an inverse kinematics function.

In some implementations, control rig 100 and hierarchical node graph 400 are subject to at least one constraint. For example, there may be a finite number of positions and/or orientations that an artist may select for knee 104. Some positions may violate physical constraints that apply to a physical skeleton associated to control rig 100. These physical constraints include biomechanical limitations of movement that apply to a physical skeleton and that are modeled by control rig 100. In the nodal hierarchy, any constraints may be grouped into a configuration node.

In some implementations, a series of forward kinematics operations are applied to at least one node in hierarchical node graph 400 for which there is no associated inverse kinematics function. The resulting location is compared to the desired location selected by the artist. Any difference in location is compared to a tolerance. If the difference is within the tolerance, then the transformation is completed. On the other hand, if the difference in locations is outside the tolerance then a further forward kinematics operation is performed on the node with the intention of achieving a difference between the calculated location and the selected location that is within the tolerance.

In some implementations, an iterative solve is required where there are overlapping solves associated with a change in a control node. It is possible that some nodes may have more than one associated inverse kinematics function related to multiple parent nodes. Most of the solves are based on trigonometry, so there may be more than one way to solve the equation.

Trigonometric solutions are generally directly solvable. A problem may arise where there are solves that require more than one solve at a time. For example, a solve may be straightforward to determine for a hand position, elbow position, and shoulder position if the hand was fixed relative to the forearm. In other words, a problem that involves three points of a limb is analytically solvable using a single trigonometric solution.

However, the artist may wish to, for example, bend a wrist back and then move the lower arm. There is a choice of trigonometric solutions. A first solution may involve the bent position of the hand, forearm, elbow, and upper arm. A second solution may involve the bent position of the hand and just the end of the forearm. In other words, when more than three points of a limb are involved in a problem, multiple trigonometric solutions involving the same points of a limb may exist. Approximation involving iterative solves may be required in such cases.

A control node selected by the artist may influence multiple parent nodes. The relationship between the control node and each of the multiple parent nodes has an associated inverse kinematics function. Therefore, a changed position and/or orientation of the control node would require multiple inverse kinematics functions to be solved iteratively to determine the positions and/or orientations of the multiple parent nodes.

In an example, when a series of movements of control rig 100 is required to match with a series of movements from a motion captured skeleton, the handles of control rig 100 are controlled by the corresponding positions of the motion captured skeleton. For example, an ankle of the motion captured skeleton drives a corresponding ankle of the control rig. The inverse kinematics operations associated with the ankle appendage node of the control rig are then used to derive the positions and/or orientations of at least thigh 102, knee 104 and lower leg 106.

Figure 5A:
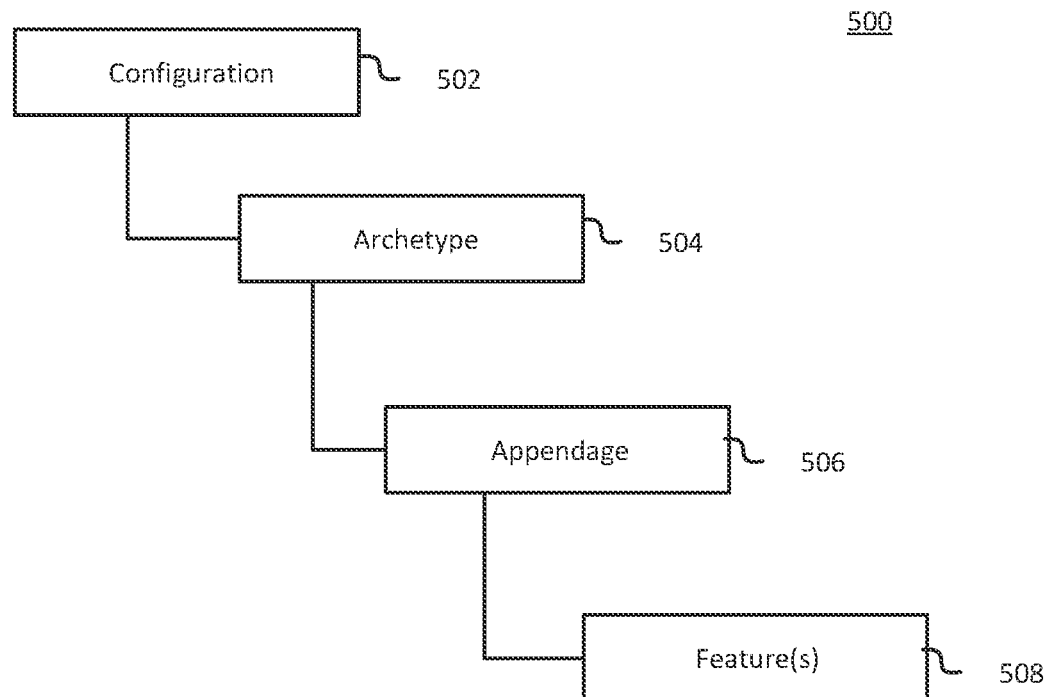
FIG. 5a illustrates an example framework of a hierarchy framework, in accordance with some implementations.

As shown in FIG. 5*a*, an example framework of a nodal hierarchy framework 500 including levels of a plurality of node types in which lower level nodes, e.g., child node, descend from upper level nodes, e.g., parent node. For example, an appendage node 506 is a lower level node with respect to an upper level archetype node 504. The hierarchy 400 shown in FIG. 4 is one example of an instance of relationships of points of movement that may be part of the hierarchy framework 500. The hierarchy framework includes, for example in descending order, a configuration node 502, an archetype node 504, an appendage node 506 and at least one feature node 508. The hierarchy may include multiple instances of each node type. For example, the hierarchy may include multiple appendage nodes.

At least some of the nodes in the hierarchy 500 inherit aspects from a standalone core component. Base core components of the core component may include at least one function, at least one interface, and/or at least one connection. Such base core components may include general components, e.g., functions, interfaces, and connections, for the hierarchy, which are different from node-specific components added to the core component by the various nodes of the hierarchy. Each node inherits the base core components and node-specific components added to the core component from a respective lower level node. Each node adds functionality on top of the inherited core components. Each node may include more functions, as well as interfaces and/or connections specific and unique to each node type on top of those inherited from the core component (base core components and added node-specific components) from a lower level node.

Figure 5B:
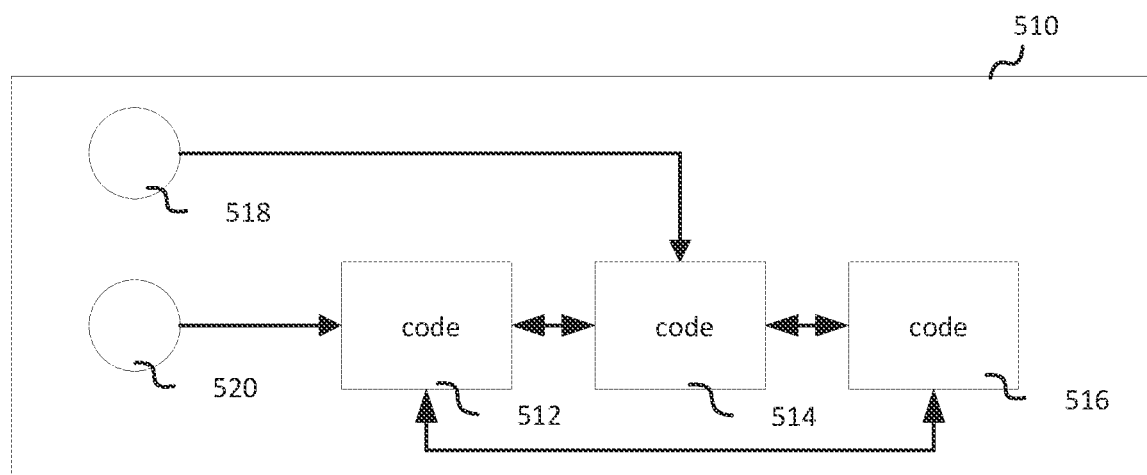
FIG. 5b illustrates an example of a core component node, in accordance with some implementations.

As shown in FIG. 5b, an example of a core component node 510. The core components of core component node 510 includes sets of functions (also referred to as code blocks) 512, 514, and 516. Each of the code blocks is shown connected to at least one other code block. Also shown is interface 518 that specifies arguments for data coming into code block 514, and interface 520 that specifies arguments for data coming into code block 512.

In some implementations, the core component nodes such as core component 510 includes standalone one or more functions (e.g., base core component functions) used as building blocks from which archetype nodes, appendage nodes, and feature nodes are created. Each of the archetype nodes, appendage nodes and feature nodes are built from core component nodes and may be modified or expanded upon for the archetype nodes, appendage nodes and feature nodes, respectively.

In some implementations the hierarchy 500 as shown in FIG. 5a may include a configuration node 502. Data in the configuration node 502 provides for settings specific to a character to define the character represented by the hierarchy 500. Characters may be subject to at least one physical constraint that imposes at least one anatomical limit on the character. The configuration node 502 may include settings related to the physical constraint(s). For example, a character may be wearing a suit of armor which restricts movement of certain appendages. Another character may have more flexibility in how the appendages interact with each other, as specified by the configuration node 502. Movement restriction may be provided by the configuration node 502.

The hierarchy 500 may include at least one archetype node 504. An archetype is a classification of characters. For example, an archetype may be used to define a family or collection of characters. One example of an archetype is a human biped. The human biped archetype can be used to represent other characters with similar bones, joints, and anatomy as a human biped. Another example of an archetype may include a quadruped animal.

The hierarchy 500 may include at least one appendage node 506. Examples of appendages of a human biped include a limb, e.g., an arm and a leg, or other projecting part of the human biped, such as a neck. Other examples of appendages can include a tail, antenna, necktie, hair, etc. In some implementations, an appendage node may specify characteristics of the appendage. Examples of additional characteristics may include whether a limb is a left limb or a right limb and whether two or more appendages for an archetype have movement that is the same or a mirror image of the other.

In some implementations, the system may apply data of a build process from one node to a similar node. For example, where a character includes multiple similar appendages of a same type, such as a left and right limb, rather than writing and compiling code for building each of the individual appendages, the system may apply the code from one appendage to the similar appendages. Any changes may be added to the functions for the similar appendage. For example, a code for a left appendage may be applied as a mirror image for a right appendage of the same type. In some implementations, automatic application may convey data from one node of a nodal hierarchy to another node of another nodal hierarchy.

In some implementations, appendage node 506 specifies a control interface of a part of the character for the artist. An example of a control interface may include one or more handles associated with the appendage and settings associated with the handles. Handles may include, for example, handles 120, 122 and 124 from FIG. 3. The handles allow the artist to select a desired position and/or orientation of the appendage.

In some implementations, at least one handle of the first nodal hierarchy is associated within the appendage node or feature node. A hierarchy may include more than one appendage node, e.g., for a leg and an arm, for a given archetype node. Separate feature nodes may be provided for the individual appendage nodes under an archetype. It may be desirable, for example, for core components and additional specific functions for an appendage to be executable across multiple similar appendages of a character, rather than having to compile each function for each appendage.

In some implementations, at least some of the appendage nodes may be used for different characters. It may be desirable, for example, for core components to be executable across multiple characters rather than having to compile each function for each character.

Hierarchy 500 may also include at least one feature node 508. In some implementations, a feature node enables a user to implement at least one code function applicable to an appendage node 506. A feature node may specify relationships of appendage nodes in the hierarchy by recalculating the local transforms for the appendage nodes, such as determining points of the appendage nodes in 3-D (three-dimensional) space. The feature nodes may include interfaces for arguments that the feature node takes in and arguments that the feature node passes out to specify the relationships between appendage nodes. As shown in FIG. 4, node 404 may represent such a feature node having interfaces represented by arrows connect into and out of node 404.

In some implementations, an example feature node may include a snap feature node to connect two or more points of different appendage nodes or connect appendage nodes with other characters, on top of each other to ensure that a world space value is the same for the connected appendage nodes and/or characters. Such a snap feature node may be used, for example, to place a prop into the hands of a character.

In some implementations, a feature may specify joints or joint requirements for the appendage nodes, such as a number of joints on which to operate, e.g., 1 joint, 2 joints, between 2 and 4 joints, or other numbers of joints. For example, a lower leg appendage may operate on two joint for a knee and an ankle. The more joints that are specified by the feature node, the greater complexity is of the resulting movement. Other examples of feature nodes may include code for two bone inverse kinematic solves to specify a relationship between the two bones of appendage nodes.

Although, FIG. 5a shows particular lower level nodes directly descending from particular upper level nodes, the hierarchy may also include other node types inserted within the hierarchy, such as between the specified nodes as shown in FIG. 5a, at the lowest end of the hierarchy and/or upper most end of the hierarchy. For example, additional nodes may include a part node that is not an appendage, such as a node for a torso part or body covering, e.g., fur, hair, or skin, of an archetype node. Furthermore, in some implementations of a hierarchy some, but not all, of the specified nodes as shown in FIG. 5a may be provided in the hierarchy. For example, a hierarchy may exclude a configuration node and/or feature nodes.

Figure 6A:
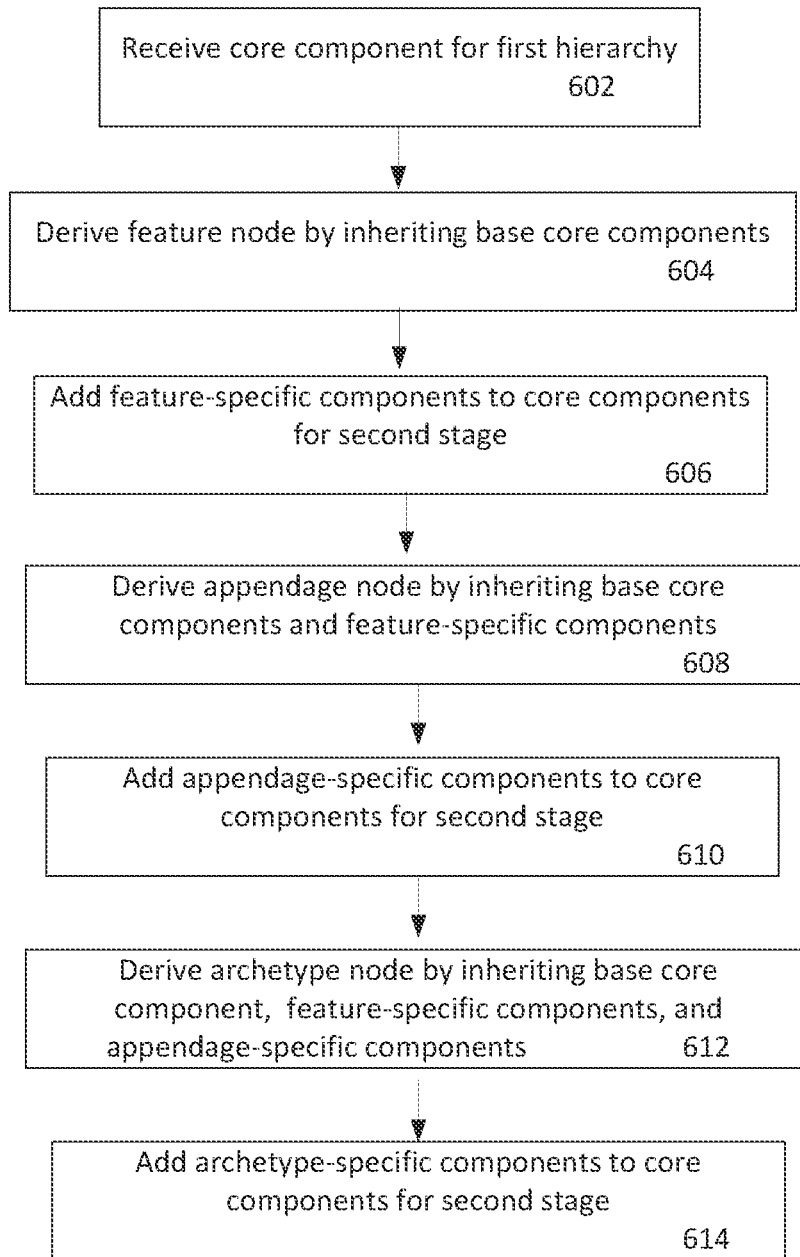
FIG. 6a is a flowchart of an example of a method of creating a control rig such as the control rig from FIG. 1 using the hierarchy framework of FIG. 4, in accordance with some implementations.

Shown in the flowchart in FIG. 6a, is an example of a method 600 of creating a control rig such as control rig 100 in FIG. 1 using the hierarchy framework 500 in FIG. 5A, in which components are inherited between levels of the hierarchy. In block 602, a core component is provided. At this first stage, the core component includes base components. Components may include one or more functions, interfaces, and/or connections that are applicable to the character associated with the animation control rig. The core component node may include a set of functions, a set of interfaces and/or a set of connections that are configured to generate an instance of the first nodal hierarchy.

In block 604, the base core components are inherited by one or more given feature nodes associated with a particular appendage node. The particular appendage node ascends from the one or more given feature nodes. In this manner, the feature nodes are derived from a first stage core component. In block 606, each given feature node associated with the particular appendage node adds to the core component, feature-specific components, which are particular to the given feature. At this second stage, the core component includes base core components and feature-specific components.

In block 608, each appendage associated with the given feature(s) inherits the base core component as well as the feature-specific components to derive the appendage nodes. In block 610, the associated appendage adds appendage-specific components to the core component. At this third stage, in block 612, the package of core components, including the base components, feature-specific components, and appendage-specific components are inherited by the archetype node for the hierarchy.

In block 614, the archetype node may pass archetype-specific components to the core component. If there are additional levels of nodes, the process of adding node-specific components and inheritance may continue along the hierarchy. The process further is applied by multiple nodes, such as multiple appendages inheriting from associated feature nodes, in the hierarchy.

Figure 6B:
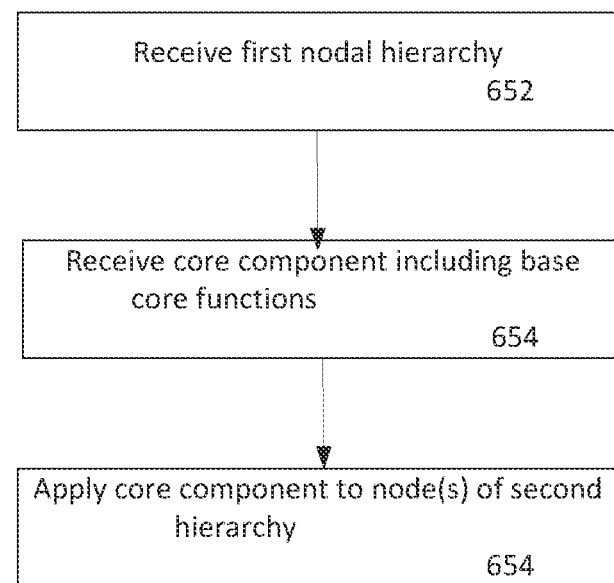
FIG. 6b is a flowchart of an example of a method of generating a second hierarchy with use of functions from a first hierarchy, in accordance with some implementations.

In FIG. 6b, a method 650 is shown as a flowchart, in which functions are shared from nodes of a first hierarchy of function groups with nodes of a second hierarchy to facilitate generating at least one node of the second hierarchy. In block 652, a first nodal hierarchy is received, such as the hierarchy produced in FIG. 6a. The first nodal hierarchy may include at least a first node, a second node coupled to the first node, and a third node coupled to the second node.

In some implementations, the first node comprises an archetype node representing a class of animated characters. The second node comprises an appendage node representing a class of appendages associated with a particular archetype. The third node comprises a feature node. In some implementations, a feature node may include packaged portions of the feature node that serve as components to be inherited by the appendage node.

In block 654, at least one core component node of the first hierarchy is provided such as core component node 510 (see FIG. 5B). The core component node may include a set of base core functions used to derive the archetype first node, the at least one appendage second node, and the at least one third node of the first hierarchy.

The at least one node of the first nodal hierarchy may relate to at least one node of a second nodal hierarchy. For example, the archetype first node of the first nodal hierarchy may be the same as or similar to, e.g., include a portion of functions that are similar or the same, the archetype first node of the second nodal hierarchy.

In block 656, the second hierarchy of function groups is generated by applying functions of at least one node of the first hierarchy to derive one or more nodes of the second hierarchy. The second nodal hierarchy may include for example a configuration node 502, a first node, such as an archetype node, one or more second nodes, such as one or more appendage nodes, and one or more third nodes, such as one or more feature nodes. In some implementations, applying of functions from one hierarchy to another hierarchy including reusing all or a portion of the functions from a first hierarchy node, including base core components, and using the shared functions in a similar or same node of the second hierarchy node to derive that second hierarchy node.

In some implementations, applying functions between hierarchies includes coupling at least part of the second nodal hierarchy to the first nodal hierarchy. In some implementations, the configuration node or archetype node of the second hierarchy may be coupled to the archetype node of the second nodal hierarchy. For example, in a case that the second hierarchy represents a second character that includes the same nodes (e.g., archetype, appendages and features) as a first character represented by the first hierarchy, the second characteristic may embody at least one different characteristics, such as the second character being a larger version of the first character. In this example, the archetype node of the first hierarchy may be reused in deriving the configuration node of the second hierarchy by making modifications to the functions of the first hierarchy archetype node associated with the different characteristic (e.g., larger statute). Such changes to the node include processes to separate blocks of code as described, for example, below with regards to FIG. 8.

For illustration purposes, quadruped characters may include a dog, cat, and horse, each having a respective hierarchy to specify differences in the appendages. Certain functions of the appendages may be reused among the characters, and functions specific to the characters may be also provided to differentiate each hierarchical group. For example, a cat may include retractable claws such that feature nodes for the cat paw appendage may enable mathematics to operate the claws. A horse may have a fused radius and ulna in its leg and require specific features to specify the relationship of the horse bones. Furthermore, there may be different limitations to these characters presented in a configuration node, such as a cat to provide flexibility in particular appendages.

In generating the second hierarchy, inheritance data may be received between the archetype node, the appendage node, and the feature node. The inheritance of data may occur from directly lower level nodes to the next higher level nodes in the hierarchy. In some implementations, limited inheritance may be applied in which inheritance is constrained by node type. One example of limited inheritance is a requirement that functions of appendage nodes may only be added to archetype nodes. The generation process is restricted, for example, from adding functions of an appendage node to a feature node.

The nodes are typically implemented in a high-level source language. The source language or source code is compiled to a lower level language to create an executable program. Compiling all source code in a control rig each time there is a change in the source code has the potential to be cumbersome and CPU-intensive. For example, after running and evaluating code to effectuate a movement of an appendage, such as an arm (e.g., via change in orientation or position of a handle), it may be decided that movement of a joint of the appendage needs to be changed, such as rotating of the wrist. It is beneficial to insert the change into a block of code for the joint of interest, e.g., wrist, rather than changing and recompiling the code for the entire appendage, e.g., arm.

In some implementations, the animation system may include automatic validation of as data structures are created with each line of code. In some systems, error detection may be implemented to assist in correction of such errors, for example by building functions on top of a configuration node, and building a test model that is run through particular metrics, such as a range of motion evaluation, to achieve an approximation of the quality of the build for that metrics. The test model may be displayed to a user, such as in a video. An artist, for example, may view the video and determine if the parameters may perform as needed.

In some implementations, the system may perform an automatic detection of problems in the code of a particular node e.g., an appendage. For example, the system may run evaluation tests on the code by checking the final movement behavior effectuated by the code against a standard (baseline) movement model. The standard movement model may be a previously built model. A feedback loop may be implemented, to automatically repair a problematic code section.

Figure 7:
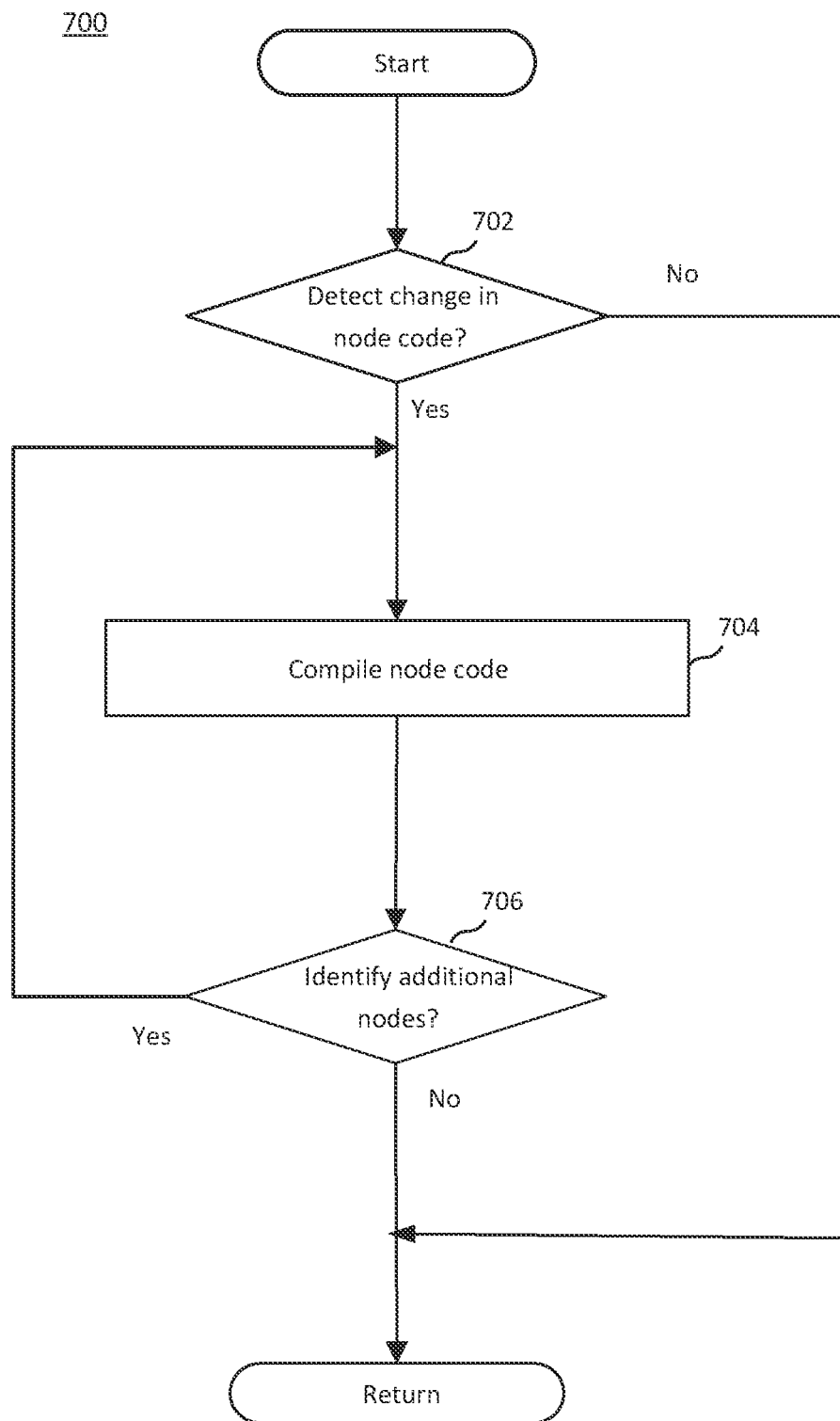
FIG. 7 illustrates an example of a method for maintaining a control rig such as the control rig from FIG. 1 using the hierarchy framework of FIG. 4, in accordance with some implementations.

As shown in FIG. 7, an example of a method 700 for maintaining a control rig such as control rig 100 from FIG. 1 using the hierarchy framework 500 of FIG. 5. The method 700 includes detecting 702 a change in the source language for a particular node. Examples of nodes for which the source code may be changed include archetype nodes, appendage nodes and feature nodes. The detection of changes may be applicable to quality control checks to determine variations in code.

In some implementations, the detecting 702 of changes in source language is performed by using a checksum. In some implementations, the checksum is used on the source language to detect a change. In some implementations, the checksum is used on the compiled language code to detect a change in the source language code that was used to generate the compiled language code.

On detecting a change in the source language for a particular node, the method 700 includes the step of compiling 704 or recompiling the source language code of the relevant node. In some implementations, only the changed nodes may be recompiled, rather than the entire code for a particular control rig.

In some implementations, the source language code for at least some of the nodes in the hierarchy framework is configured as stand-alone modules. Recompiling the source language code for a first node does not always require recompiling the source language code for every other node in a hierarchy.

Method 700 includes checking 706 whether there are other nodes for which the source language code needs to be recompiled. In some implementations, the method includes traversing the hierarchical structure to examine the relationship between the first node for which a change has been detected in step 702 above and a second node, or at least one other node, in the hierarchical structure.

In some implementations, a second node is identified as requiring recompiling if the second node is in a parent-relationship with a first node, and the first node has been recompiled. For example, if a change is detected in a feature node then the feature node source language code is recompiled. If there is an appendage node that is in a parent-child relationship with the feature node then the appendage node is recompiled.

On the other hand, if there is a change detected in an appendage node then the appendage node source language code is recompiled. If there is an archetype node that is in a parent-child relationship with the appendage node then the archetype node source language code is recompiled. However, any feature nodes that the appendage node is in a parent-child relationship are not selected for recompilation solely because the appendage node has been recompiled. Recompiling the appendage node source code does not necessitate recompiling the source code of any related feature nodes.

Figure 8:
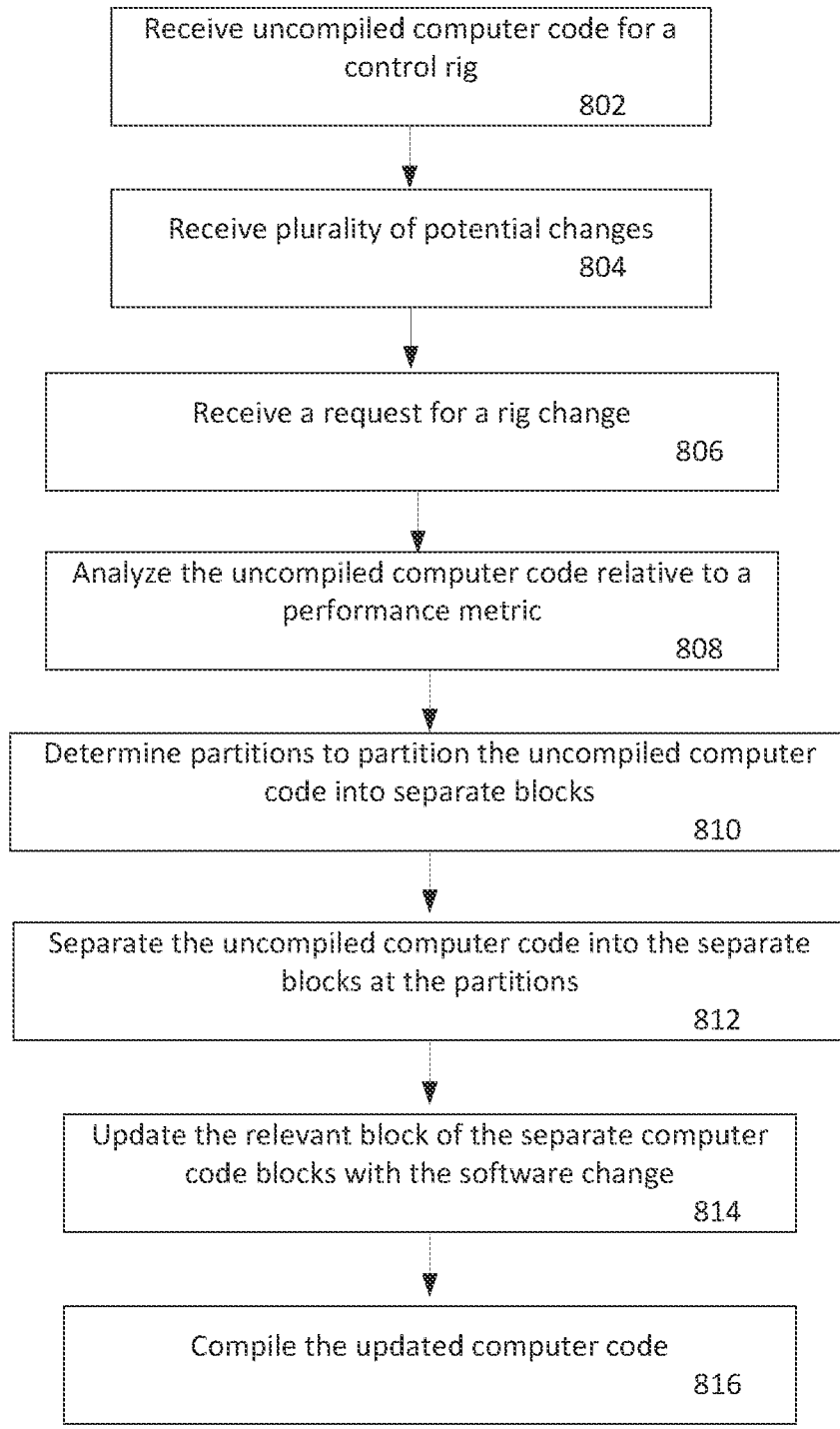
FIG. 8 illustrates an example process for amending a control rig such as the control rig from FIG. 1 using the hierarchy framework of FIG. 4, in accordance with some implementations.

Oftentimes, changes need to be made to uncompiled code, for example, to reuse the code within a hierarchy or in the generation of another control rig via another hierarchy. Referring to FIG. 8, a method 800 includes receiving 802 uncompiled computer code associated with an animation control rigging system. In some implementations, the uncompiled computer code includes source language or source code associated with at least one node in the first animation creation system.

FIG. 8 shows an example partition separation process 800 for amending a control rig such as control rig 100 from FIG. 1 using the hierarchy framework 500 of FIG. 5A. The process is particularly suited to an environment in which there is implemented at least a first animation creation system and a second animation creation system. An example of an animation creation system is shown at 1030 in FIG. 10 below.

In some implementations, at least some of the nodes are implemented in a high-level source language in the first animation creation system. The source language or source code is compiled to a lower level language to create an executable program. The compiled code may be then passed to the second animation creation system for further processing.

As described above with reference to FIGS. 5A, 6, and 7, where a change is needed to a node, it is necessary to recompile the code associated with that node. It may be also necessary to recompile code associated with other nodes within a control rig. The code may be recompiled in the first animation creation system before being passed to the second animation creation system.

For example, an artist may be working with a control rig in the first animation creation system. The control rig includes an upper arm control, a lower arm control and a wrist control. The upper arm control is connected to the lower arm control. The lower arm control is connected to the wrist control.

Some systems have a disadvantage of compiling the upper arm control, the lower arm control, and the wrist control in the first animation creation system, as a single evaluation unit. A second animation creation system would then treat the received single evaluation unit as a single node. It can therefore be problematic for an artist to introduce a change, such as a constraint on the node in the second animation creation system.

One example of an additional constraint that may arise is where an artist requires part of the control rig to be pinned to a particular location. For example, a lower arm may be resting on an inanimate object such as a table. The upper arm control and lower arm control may have been compiled in the first animation creation system. It is not a trivial task to break a single node containing the upper arm control and the lower arm control within the second animation creation system to add such an additional constraint to the lower arm.

A method 800 shown via a flowchart in FIG. 8 enables partitioning of code, such as an evaluation unit, to effectuate a change in the code. In block 802, the method 800 includes receiving uncompiled computer code associated with an animation control rig. In some implementations the uncompiled computer code may include source language or source code, preprocessed source code by a preprocessor prior to compiling, and other uncompiled computer code, associated with at least one node in the first animation creation system.

In block 804, the method 800 includes receiving a plurality of potential changes that may be available to be applied to characteristics of an animation control rig. The plurality of potential changes may be in the form of one or more lists of such available changes that may be used to select at least one particular change. In some implementations, the change may be applied to existing characteristics of a control rig for an animated object. An example of a rig change may include an additional constraint to apply to the control rig, in which the additional constraint was not included in the uncompiled code received in block 802. Other rig changes may include alterations to a node, interface changes, and changes in connections of one or more nodes. As described above, an example of an additional constraint may include a requirement that at least part of the control rig be pinned to an inanimate object, for example a lower arm resting on a table.

In some implementations, the change may be an alteration of node(s) of an existing control rig of a first animated object to generate another control rig for a similar, but different animated object. For example, functions from a node of a first hierarchy for a control rig for first animated object may be reused and altered in the creation of a second hierarchy for another control rig for a second animated object.

In block 806, a request for a particular change from the plurality of potential changes available, is received. For example, a user request may be made by a user selecting the particular change from a list of available changes presented to on a user device.

In block 808, the uncompiled code is analyzed relative to a performance metric to determine 806 at least one partition for separating the uncompiled code into two or more blocks. Examples of performance metrics may include a predicted processing time of at least one of the code blocks during runtime. For example, a performance metric may include an aggregate of predicted processing times of two or more code blocks following partitioning. The performance metric may include a threshold processing time.

Analysis of the uncompiled code may include determining predicted processing times for each of the partitioned blocks and determining the aggregate of predicted processing times. Partitioning may be performed so that overall processing time of the code is within and does not exceed an expected threshold processing time. Other performance matric may include an error threshold in which partitions at particular blocks may result in predicted errors within a threshold. Other performance matric may include a quality measurement which may represent a closeness of a resulting animated character to a target character. For example, a quality measurement may assess how realistic a resulting animated character may be if particular partitions are performed in the code.

There is expected to be a processing cost associated with each code block. Breaking the code into more blocks may result in tradeoff of reduced performance, e.g., increased processing time. For example, it would be expected that the total processing cost incurred by the second animation system associated with the three code blocks would exceed the processing cost incurred by a single code block combining the upper arm, the lower arm, and the wrist. In some implementations the method 800 may further include providing a visual indication of the performance metric. For example, display 1012 of computer system 1000 of FIG. 10 (described below) may present the artist with the output of a widget or similar software component.

In some implementations, artificial intelligence may be employed to determine the specified level of runtime performance, for example, by recursively determining a cost/benefit ratio relative to a physical location chosen to insert the change in the computer code before the compilation step. A neural network may predict one or more partitions in the code that is expected to produce the required movement changes within one or more performance thresholds, e.g., a particular processing time. The neural network may be improved using feedback information from fixed of initial code issues. The neural network may then be employed to determine the partitions in the code.

In some implementations, one or more widgets may be configured to receive a user selection of one or more separation parameters associated with portioning at least one of the code blocks into two or more code blocks. In some implementations the widget may be configured to display a value of a performance metric. For example, where the performance metric is a threshold processing time, the widget may be configured to display a predicted processing time for an aggregate of code blocks determined by the user. The user may therefore select one or more separation parameters to effectuate separating of code blocks, e.g., where to break the code and/or into how many blocks, in accordance with the performance metric.

As a result of the analysis, in block 810, a determination is made of at least one partition to partition or separate the uncompiled code into individual computer blocks. The determination of the partition may include identifying one or more relevant blocks to insert a software change associated with the particular change to effectuate such a change in the rig. There may be a required partition that may need to be accessed in order to successfully effectuate a particular change. For example, an artist may wish to add an additional constraint to a lower arm of a control rig. To isolate the uncompiled code for lower arm and build such a software change in the lower arm, the uncompiled code associated with an upper arm may need to be partitioned into a separate block from the uncompiled code block associated with the lower arm. Furthermore, the uncompiled code associated with a wrist may be required to be partitioned into a separate block from the uncompiled code block associated with the lower arm.

In block 812, the uncompiled code is separated according to the partition(s). As a result of separation at the identified partition locations in the uncompiled computer code, the single block of uncompiled code is separated into two or more computer code blocks of uncompiled code. For example, the result may be separate uncompiled code blocks associated with the upper arm, the lower arm, and the wrist, respectively.

In some implementations, the partitioning performed at block 812 may result in additional code blocks being passed to a second animation system. For example, the upper arm, the lower arm, and the wrist may be implemented as a single code block in the first animation system. Partitioning may result in three separate code blocks associated with the upper arm, the lower arm, and the wrist, respectively. After recompiling some or all of the code blocks, the blocks may be passed, for example, to a second animation system as three separate blocks rather than one single block.

For illustration purposes, separation of functions for an arm appendage may produce individual uncompiled code blocks associated with an upper arm, a lower arm, and a wrist, respectively. As described above with reference to FIG. 5A, the lower arm may be defined as an appendage in the hierarchy 500. Any changes to the lower arm appendage would require recompilation of the code associated with the lower arm appendage and may require recompilation of other components, but not necessarily all components, in the hierarchy.

In block 814, the software change is made to at least some of the uncompiled code so as to update the relevant uncompiled code blocks of the separate computer code blocks. In this manner, the relevant block is updated with the software change to create updated computer code. For example, where an artist requires an additional constraint to be placed on the lower arm, the block of uncompiled code associated with the lower arm may be updated. Updates may not necessarily be required to the block of uncompiled code associated with the upper arm or the block of uncompiled code associated with the wrist.

In block 816, the updated uncompiled code is compiled to generate the animation control rig. In the illustrated example, code associated with the lower arm may then be recompiled.

In some implementations, the partitioning performed at block 812 may result in additional code blocks being passed to a second animation system. For example, the upper arm, the lower arm, and the wrist may be implemented as a single code block in the first animation system. Partitioning may result in three separate code blocks associated with the upper arm, the lower arm, and the wrist, respectively. After recompiling some or all of the code blocks, the relevant blocks may be passed to the second animation system as separate blocks, such as three blocks, rather than one single block.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Although the steps may be presented in a specific order, this order may be changed in different particular implementations. For example, in some implementations, the receptacles may be inserted into the wearable article prior to stringing the active marker light core component to the receptacle. In some implementations, the proximal end of the strand may be coupled to the control unit prior to some or all of the other steps. In some implementations, the strand may consist of attachable sections, e.g., each section including an active marker light core component, and the strand sections may be attached end to end to install the active marker light core components within the respective receptacles. In some particular implementations, multiple steps shown as sequential in this specification can be performed at the same time.

Example Computer System

Figure 9:
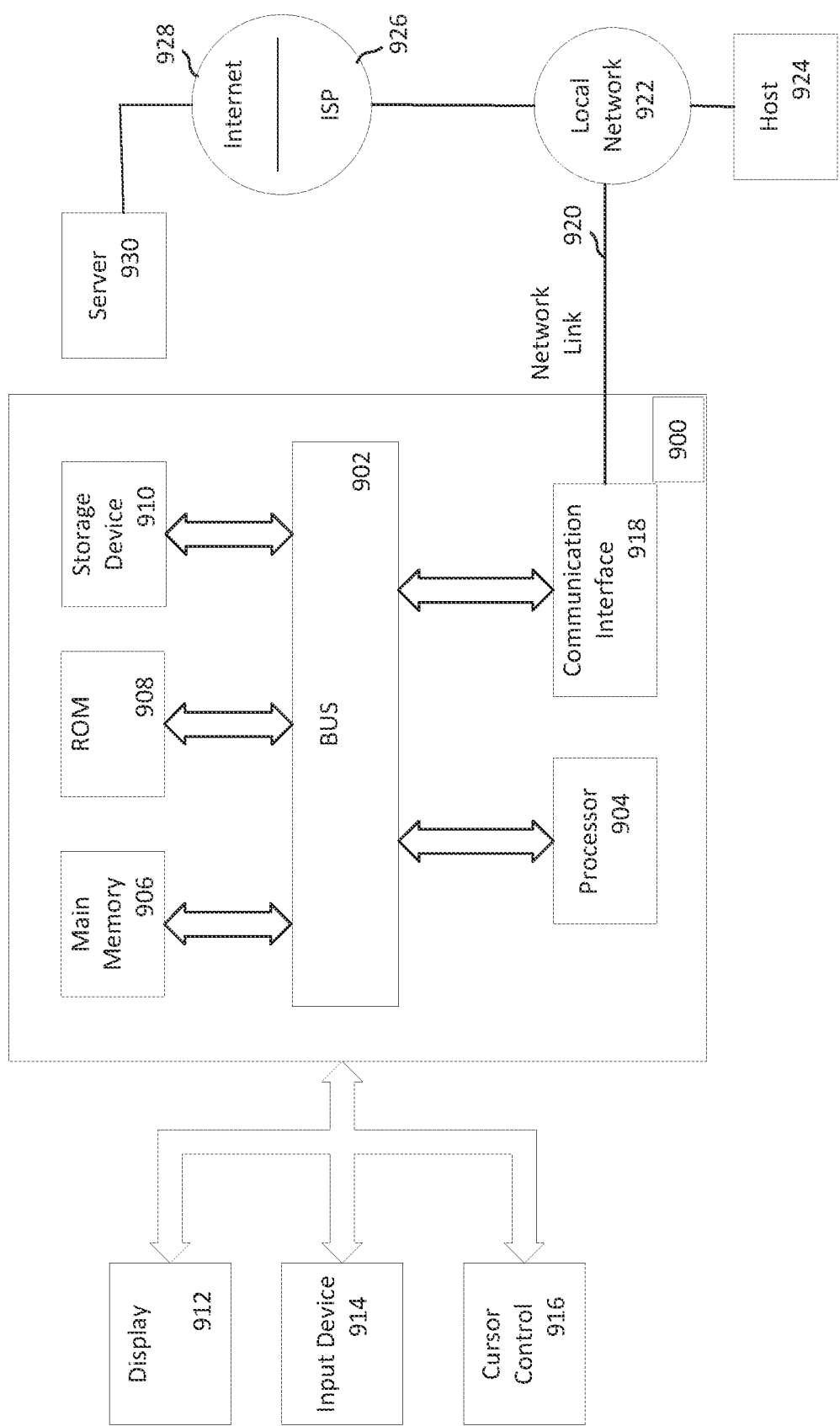
FIG. 9 is a block diagram illustrating an example computer system upon which computer systems of the systems illustrated herein may be implemented, in accordance with some implementations.

FIG. 9 is a block diagram that illustrates computer system 900 upon which visual content generation system 1000 (see FIG. 10) may be implemented. Computer system 900 includes bus 902 or other communication mechanism for communicating information, and processor 904 coupled with bus 902 for processing information. Processor 904 may be, for example, a general purpose microprocessor.

The computer system 900 also includes main memory 906, such as a random access memory (RAM) or other dynamic storage device, coupled to bus 902 for storing information and instructions to be executed by the processor 904. The main memory 906 may also be used for storing temporary variables or other intermediate information during execution of instructions to be executed by the processor 904. Such instructions, when stored in non-transitory storage media accessible to the processor 904, render the computer system 900 into a special-purpose machine that is customized to perform the operations specified in the instructions.

The computer system 900 further includes a read only memory (ROM) 908 or other static storage device coupled to the bus 902 for storing static information and instructions for the processor 904. A storage device 910, such as a magnetic disk or optical disk, is provided and coupled to the bus 902 for storing information and instructions.

The computer system 900 may be coupled via the bus 902 to a display 912, such as a computer monitor, for displaying information to a computer user. An input device 914, including alphanumeric and other keys, is coupled to the bus 902 for communicating information and command selections to the processor 904. Another type of user input device is a cursor control 916, such as a mouse, a trackball, or cursor direction keys for communicating direction information and command selections to the processor 904 and for controlling cursor movement on the display 912. This input device typically has two degrees of freedom in two axes, a first axis (e.g., x) and a second axis (e.g., y), that allows the device to specify positions in a plane.

The computer system 900 may implement the techniques described herein using customized hard-wired logic, one or more ASICs or FPGAs, firmware and/or program logic which in combination with the computer system causes or programs the computer system 900 to be a special-purpose machine. According to one embodiment, the techniques herein are performed by the computer system 900 in response to the processor 904 executing one or more sequences of one or more instructions contained in the main memory 906. Such instructions may be read into the main memory 906 from another storage medium, such as the storage device 910. Execution of the sequences of instructions contained in the main memory 906 causes the processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as the storage device 910. Volatile media includes dynamic memory, such as the main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 902. Transmission media can also take the form of acoustic or light waves, such as those generated during radio-wave and infra-red data communications.

Various forms of media may be involved in carrying one or more sequences of one or more instructions to the processor 904 for execution. For example, the instructions may initially be carried on a magnetic disk or solid state drive of a remote computer. The remote computer can load the instructions into its dynamic memory and send the instructions over a network connection. A modem or network interface local to the computer system 900 can receive the data. The bus 902 carries the data to the main memory 906, from which the processor 904 retrieves and executes the instructions. The instructions received by the main memory 906 may optionally be stored on the storage device 910 either before or after execution by the processor 904.

The computer system 900 also includes a communication interface 918 coupled to the bus 902. The communication interface 918 provides a two-way data communication coupling to a network link 920 that is connected to a local network 922. For example, the communication interface 918 may be an integrated services digital network (ISDN) card, cable modem, satellite modem, or a modem to provide a data communication connection to a corresponding type of telephone line. Wireless links may also be implemented. In any such implementation, the communication interface 918 sends and receives electrical, electromagnetic, or optical signals that carry digital data streams representing various types of information.

The network link 920 typically provides data communication through one or more networks to other data devices. For example, the network link 920 may provide a connection through the local network 922 to a host computer 924 or to data equipment operated by an Internet Service Provider (ISP) 926. The ISP 926 in turn provides data communication services through the worldwide packet data communication network now commonly referred to as the "Internet" 928. The local network 922 and Internet 928 both use electrical, electromagnetic, or optical signals that carry digital data streams. The signals through the various networks and the signals on the network link 920 and through the communication interface 918, which carry the digital data to and from the computer system 900, are example forms of transmission media.

The computer system 900 can send messages and receive data, including program code, through the network(s), the network link 920, and communication interface 918. In the Internet example, a server 930 might transmit a requested code for an application program through the Internet 928, ISP 926, local network 922, and communication interface 918. The received code may be executed by the processor 904 as it is received, and/or stored in the storage device 910, or other non-volatile storage for later execution.

Figure 10:
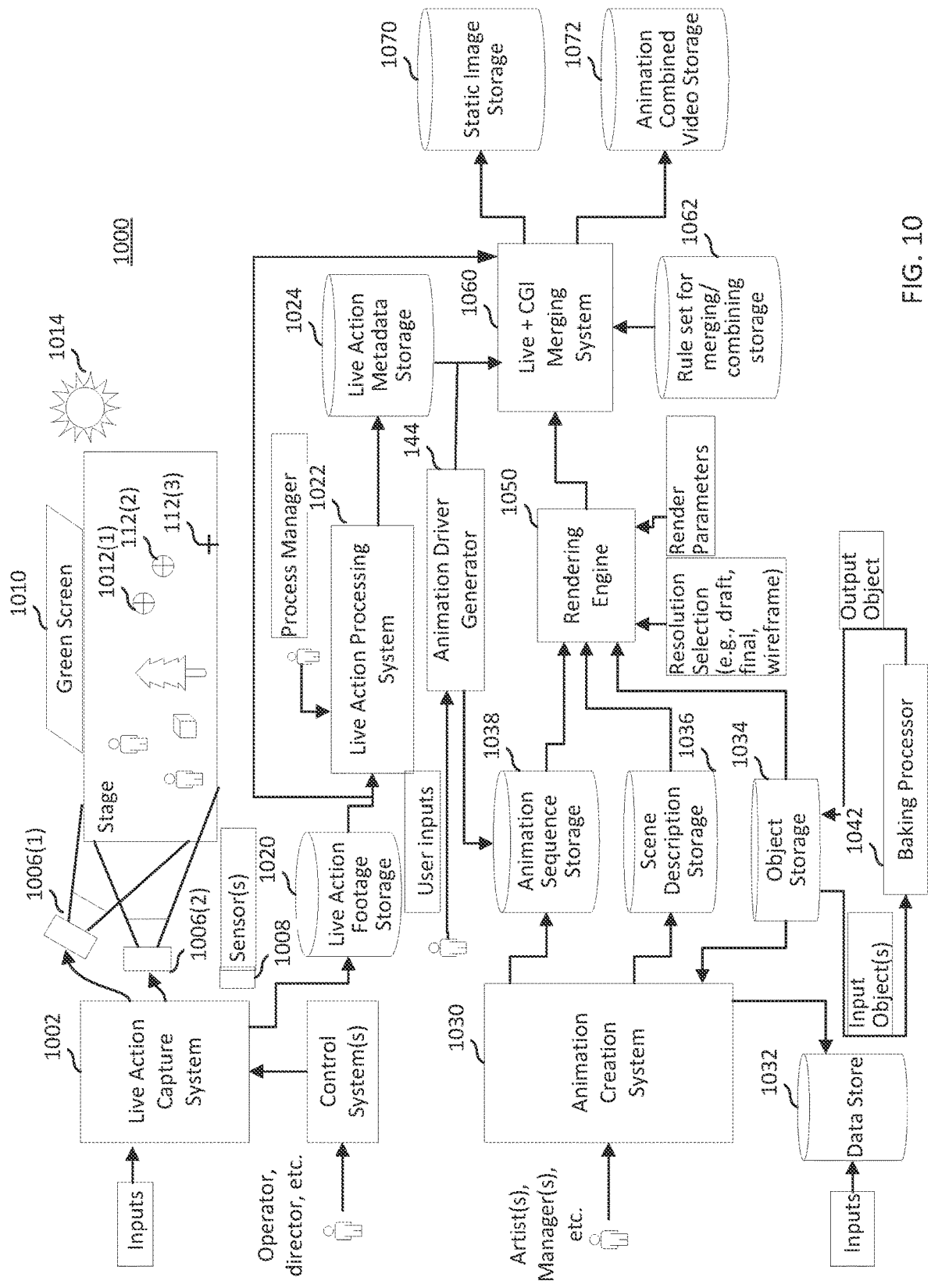
FIG. 10 illustrates an example visual content generation system as might be used to generate imagery in the form of still images and/or video sequences of images, in accordance with some implementations.

For example, FIG. 10 illustrates the example visual content generation system 1000 as might be used to generate imagery in the form of still images and/or video sequences of images. The visual content generation system 1000 might generate imagery of live action scenes, computer generated scenes, or a combination thereof. In a practical system, users are provided with tools that allow them to specify, at high levels and low levels where necessary, what is to go into that imagery. For example, a user might be an animation artist (like the artist 142 illustrated in FIG. 1) and might use the visual content generation system 1000 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 1000 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimension of such a two-dimensional array of pixel color values might correspond to a preferred and/or standard display scheme, such as 1920 pixel columns by 1280 pixel rows. Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist (e.g., the artist 142 illustrated in FIG. 1) might specify the positions in a scene space, such as a three-dimensional coordinate system, of objects and/or lighting, as well as a camera viewpoint, and a camera view plane. Taking all of that as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

Example Live Action Capture System

As illustrated in FIG. 10, a live action capture system 1002 captures a live scene that plays out on a stage 1004. The live action capture system 1002 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1006(1) and 1006(2) capture the scene, while in some systems, there might be other sensor(s) 1008 that capture information from the live scene (e.g., infrared cameras, infrared sensors, motion capture ("mo-cap") detectors, etc.). On the stage 1004, there might be human actors, animal actors, inanimate objects, background objects, and possibly an object such as a green screen 1010 that is designed to be captured in a live scene recording in such a way that it is easily overlaid with computer-generated imagery. The stage 1004 might also contain objects that serve as fiducials, such as fiducials 1012(1)-(3), that might be used post-capture to determine where an object was during capture. A live action scene might be illuminated by one or more lights, such as an overhead light 1014.

During or following the capture of a live action scene, the live action capture system 1002 might output live action footage to a live action footage storage 1020. A live action processing system 1022 might process live action footage to generate data about that live action footage and store that data into a live action metadata storage 1024. The live action processing system 1022 might include computer processing capabilities, image processing capabilities, one or more processors, program code storage for storing program instructions executable by the one or more processors, as well as user input devices and user output devices, not all of which are shown. The live action processing system 1022 might process live action footage to determine boundaries of objects in a frame or multiple frames, determine locations of objects in a live action scene, where a camera was relative to some action, distances between moving objects and fiducials, etc. Where elements are sensored or detected, the metadata might include location, color, and intensity of the overhead light 1014, as that might be useful in post-processing to match computer-generated lighting on objects that are computer-generated and overlaid on the live action footage. The live action processing system 1022 might operate autonomously, perhaps based on predetermined program instructions, to generate and output the live action metadata upon receiving and inputting the live action footage. The live action footage can be camera-captured data as well as data from other sensors.

An animation creation system 1030 is another part of the visual content generation system 1000. The animation creation system 1030 might include computer processing capabilities, image processing capabilities, one or more processors, program code storage for storing program instructions executable by the one or more processors, as well as user input devices and user output devices, not all of which are shown. The animation creation system 1030 might be used by animation artists, managers, and others to specify details, perhaps programmatically and/or interactively, of imagery to be generated. From user input and data from a database or other data source, indicated as a data store 1032, the animation creation system 1030 might generate and output data representing objects (e.g., a horse, a human, a ball, a teapot, a cloud, a light source, a texture, etc.) to an object storage 1034, generate and output data representing a scene into a scene description storage 1036, and/or generate and output data representing animation sequences to an animation sequence storage 1038. [124] Scene data might indicate locations of objects and other visual elements, values of their parameters, lighting, camera location, camera view plane, and other details that a rendering engine 1050 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 1030 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 1034 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 1032 might be used to drive object presentation. For example, if an artist is creating an animation of a spaceship passing over the surface of the Earth, instead of manually drawing or specifying a coastline, the artist might specify that the animation creation system 1030 is to read data from the data store 1032 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Zi) to (X2, Y2, Z2) over time Ti to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1044 might read in live action metadata, such as data representing movements and positions of body parts of a live actor during a live action scene, and generate corresponding animation parameters to be stored in the animation sequence storage 1038 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 1022. The animation driver generator 1044 might convert that movement data into specifications of how joints of an articulated CGI character are to move over time.

A rendering engine 1050 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important that speed for a movie maker to generate data that will be used for final prints of feature films to be distributed. The rendering engine 1050 might include computer processing capabilities, image processing capabilities, one or more processors, program code storage for storing program instructions executable by the one or more processors, as well as user input devices and user output devices, not all of which are shown.

The visual content generation system 1000 can also include a merging system 1060 that merges live footage with animated content. The live footage might be obtained and input by reading from the live action footage storage 1020 to obtain live action footage, by reading from the live action metadata storage 1024 to obtain details such as presumed segmentation in captured images segmenting objects in a live action scene from their background (perhaps aided by the fact that the green screen 1010 was part of the live action scene), and by obtaining CGI imagery from the rendering engine 1050.

A merging system 1060 might also read data from a rulesets for merging/combining storage 1062. A very simple example of a rule in a ruleset might be "obtain a full image including a two-dimensional pixel array from live footage, obtain a full image including a two-dimensional pixel array from the rendering engine 1050, and output an image where each pixel is a corresponding pixel from the rendering engine 1050 when the corresponding pixel in the live footage is a specific color of green, otherwise output a pixel value from the corresponding pixel in the live footage."

The merging system 1060 might include computer processing capabilities, image processing capabilities, one or more processors, program code storage for storing program instructions executable by the one or more processors, as well as user input devices and user output devices, not all of which are shown. The merging system 1060 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 1060, such as modifying boundaries of segmented objects, inserting blurs to smooth out imperfections, or adding other effects. Based on its inputs, the merging system 1060 can output an image to be stored in a static image storage 1070 and/or a sequence of images in the form of video to be stored in an animated/combined video storage 1072.

Thus, as described, the visual content generation system 1000 can be used to generate video that combines live action with computer-generated animation using various components and tools, some of which are described in more detail herein. While the visual content generation system 1000 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored as instructions on a computer-readable storage medium, for example, in the form of a computer program comprising a plurality of instructions executable by one or more processors. The computer-readable storage medium may be non-transitory. [135] Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: fA}, fB}, fC}, {A, B}, fA, C}, {B, C}, fA, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to examples of embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for generating an animation control rig configured to manipulate a skeleton of an animated character, the method comprising:
    providing a first hierarchy of function groups which includes an archetype first node that embodies a first character classification of a first archetype, at least one appendage second node descending from the archetype first node, and at least one feature third node descending from the appendage second node;
    providing at least one core component node that includes a set of base core functions used to derive the archetype first node, the at least one appendage second node, and the at least one feature third node of the first hierarchy by the at least one appendage second node inheriting functions from the at least one feature third node including the set of base core functions and feature functions, and by the archetype first node inheriting functions from the at least one appendage second node including the set of base core functions, the feature functions, and appendage functions; and
    generating a second hierarchy of function groups, which includes an archetype first node and an appendage second node, wherein generating of the second hierarchy includes applying the at least one core component node to derive the appendage second node of the second hierarchy, wherein the archetype first node of the second hierarchy embodies a second character classification of a second archetype that is different from the first archetype of the first character classification, wherein at least one the first archetype or the second archetype is non-humanoid.

2. The method of claim 1, wherein the at least one core component node further includes at least one of one or more interfaces or one or more connections.

3. The method of claim 1, wherein the second hierarchy relates to the first hierarchy through a similarity of the appendage second node of the second hierarchy to an appendage second nodes of the at least one appendage second node of the first hierarchy.

4. The method of claim 1, wherein the first hierarchy includes at least two appendage second nodes and the at least one feature third node is a feature node specifying a relationship between two or more of the at least two appendage second nodes.

5. The method of claim 1, wherein providing the archetype first node, the at least one appendage second node, and the at least one feature third node of the first hierarchy is by each given node of the archetype first node, the at least one appendage second node, and the at least one feature third node inheriting core components of a respective lower level node in the first hierarchy and adding respective functions specific to the given node to derive the given node from the core component.

6. The method of claim 1, further comprising:
    preventing inheritance of functions by the at least one appendage second node from the archetype first node and by the at least one feature third node from the at least one appendage second node of the first hierarchy.

7. The method of claim 1, further comprising
    detecting a change in at least one given node of the archetype first node, the at least one appendage second node, or the at least one feature third node of the first hierarchy, and
    in response to detecting the change, compiling source code associated with the change in the at least one given node.

8. The method of claim 7, wherein detecting the change includes detecting a change in a given feature third node of the first hierarchy, and wherein the method further comprises:
    in response to detecting the change in the given feature third node, propagating a change in a given appendage second node of the first hierarchy based, at least in part, on a relationship between the given feature third node and the given appendage second node within the first hierarchy; and compiling source code associated with the at least one appendage second node.

9. A computer system for generating an animation control rig configured to manipulate a skeleton of an animated character, comprising:
    one or more processors; and
    a storage medium storing instructions, which when executed by the one or more processors, are operable for:
    providing a first hierarchy of function groups which include an archetype first node that embodies a first character classification, at least one appendage second node descending from the archetype first node, and at least one feature third node descending from the appendage second node;
    providing at least one core component node that includes a set of base core functions used to derive the archetype first node, the at least one appendage second node, and the at least one feature third node of the first hierarchy by the at least one appendage second node inheriting functions from the at least one feature third node including the set of base core functions and feature functions, and by the archetype first node inheriting functions from the at least one appendage second node including the set of base core functions, the feature functions, and appendage functions; and generating a second hierarchy of function groups, which includes an archetype first node and an appendage second node, wherein generating of the second hierarchy includes applying the at least one core component node to derive the appendage second node of the second hierarchy, wherein the archetype first node of the second hierarchy embodies a second character classification that is different from the first character classification.

10. The computer system of claim 9, wherein the second hierarchy relates to the first hierarchy through a similarity of one or more nodes of the second hierarchy to at least one of: the archetype first node, the at least one appendage second node, or the at least one feature third node of the first hierarchy.

11. The computer system of claim 9, wherein the at least one core component node further includes at least one of one or more interfaces or one or more connections.

12. The computer system of claim 9, wherein the first hierarchy includes at least two appendage second nodes and the at least one feature third node is a feature node specifying a relationship between two or more of the at least two appendage second nodes.

13. The computer system of claim 9, wherein providing the archetype first node, the at least one appendage second node, and the at least one feature third node of the first hierarchy is by each given node of the archetype first node, the at least one appendage second node, and the at least one feature third node, inheriting core components of a respective lower level node in the first hierarchy and adding respective functions specific to the given node to derive the given node from the at least one core component node.

14. The computer system of claim 9, further comprising:
preventing inheritance of functions by the at least one appendage second node from the archetype first node and by the at least one feature third node from the at least one appendage second node of the first hierarchy.

15. A non-transitory storage medium storing instructions to generate an animation control rig configured to manipulate a skeleton of an animated character, which when executed by at least one processor, are operable for:
providing a first hierarchy of function groups which includes an archetype first node that embodies a first character classification, at least one appendage second node descending from the archetype first node, and at least one feature third node descending from the appendage second node;

providing at least one core component node that includes a set of base core functions used to derive the archetype first node, the at least one appendage second node, and the at least one feature third node of the first hierarchy by the at least one appendage second node inheriting functions from the at least one feature third node including the set of base core functions and feature functions, and by the archetype first node inheriting functions from the at least one appendage second node including the set of base core functions, the feature functions, and appendage functions; and generating a second hierarchy of function groups, which includes an archetype first node and an appendage second node, wherein generating of the second hierarchy includes applying the at least one core component node to derive the appendage second node of the second hierarchy, wherein the archetype first node of the second hierarchy embodies a second character classification that is different from the first character classification.

16. The non-transitory storage medium of claim 15, wherein the at least one core component node further includes at least one of one or more interfaces or one or more connections.

17. The non-transitory storage medium of claim 15, wherein the second hierarchy relates to the first hierarchy through a similarity of one or more nodes of the second hierarchy to at least one of: the archetype first node, the at least one appendage second node, or the at least one feature third node of the first hierarchy.

18. The non-transitory storage medium of claim 15, wherein the first hierarchy includes at least two appendage second nodes and the at least one feature third node is a feature node specifying a relationship between two or more of the at least two appendage second nodes.

19. The non-transitory storage medium of claim 15, wherein providing the archetype first node, the at least one appendage second node, and the at least one feature third node of the first hierarchy is by each given node of the archetype first node, the at least one appendage second node, and the at least one feature third node, inheriting core components of a respective lower level node in the first hierarchy and adding respective functions specific to the given node to derive the given node from the at least one core component node.

20. The non-transitory storage medium of claim 15, further comprising:
preventing inheritance of functions by the at least one appendage second node from the archetype first node and by the at least one feature third node from the at least one appendage second node of the first hierarchy.

* * * * *